Nov. 2, 1926.

J. W. BATE 1,605,497

OIL CIRCULATOR AND GAUGE

Filed Jan. 23, 1925

Inventor:
John W. Bate,

Patented Nov. 2, 1926.

1,605,497

UNITED STATES PATENT OFFICE.

JOHN W. BATE, OF RACINE, WISCONSIN.

OIL CIRCULATOR AND GAUGE.

Application filed January 23, 1925. Serial No. 4,227.

This invention relates to oil gauges and indicators for automobile engines and particularly adapted to be used on Ford automobile engines.

The primary object of the invention is to provide a means for indicating the approximate level of oil in the crank case of Ford automobiles.

Another object is to provide a means for causing circulation of oil from the fly wheel housing to the front end of a crank case.

Figure 1:
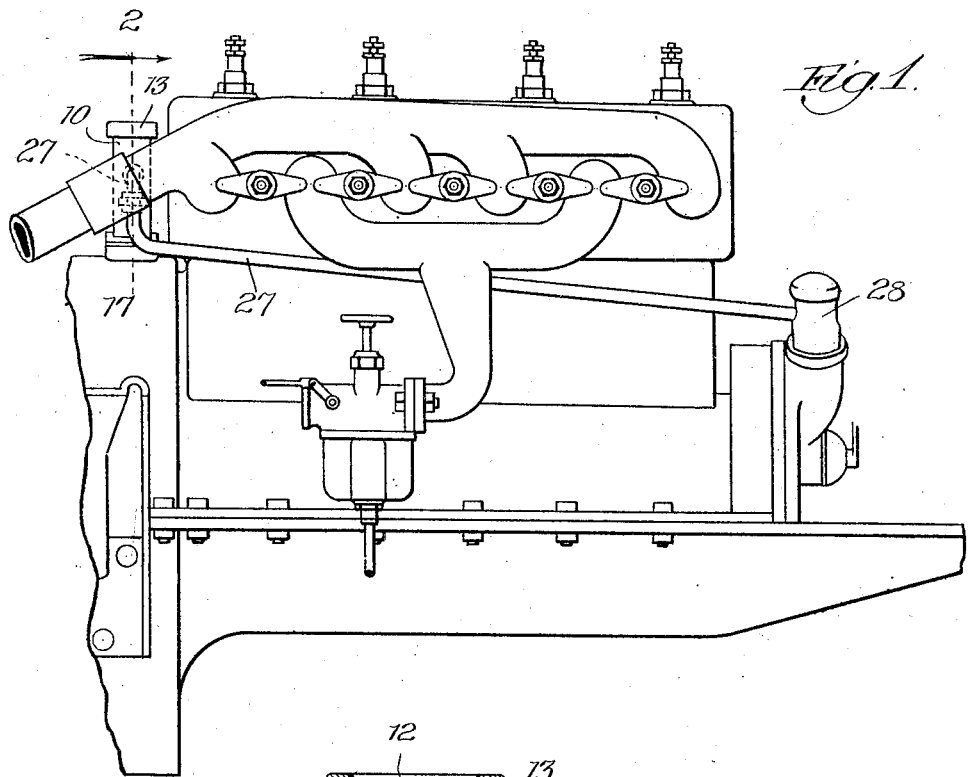
Figure 2:
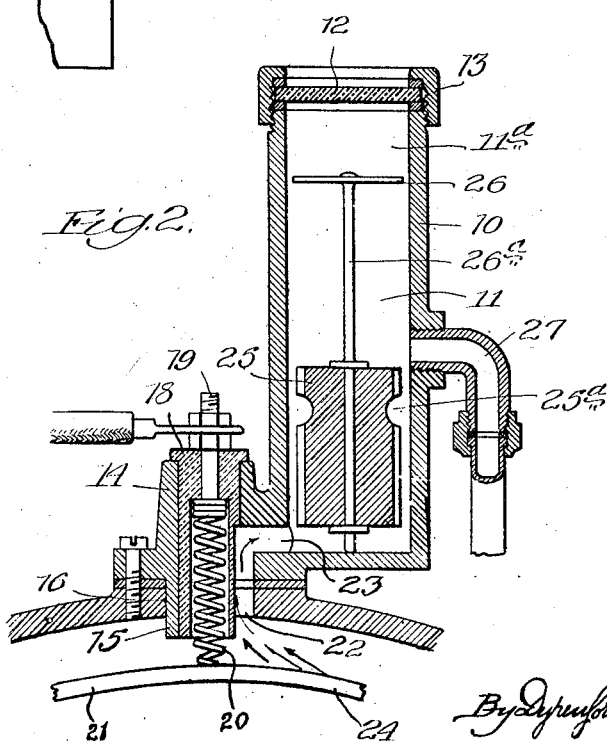

These and other objects as will readily appear from the following description are fully described in the following specification and shown in the accompanying drawing, in which:

Figure 1 is a partial side elevation of an automobile engine equipped with the invention; and Fig. 2 is an enlarged partial section on the line 2 of Fig. 1.

The embodiment illustrated comprises a housing 10 having a vertical cylinder 11 surmounted by a glass case 12 which is retained thereon by a screw cap 13. This housing is formed integral with a magneto contact body 14 which has a reduced lower end 15 adapted to fit into an opening 16 which is located at the top of the transmission housing 17. This magneto contact body 14 has an insulated center 18 through which passes a metallic contact 19 terminating at the lower end in a spring contact point 20 which is adapted to make electrical contact with a fixed member 21 forming part of the magneto in a manner, common to Ford engines.

The magneto contact thus formed is substantially the same as that commonly used on Fords and replaces the usual Ford magneto contact. It, however, serves also to support the oil gauge housing 10 and is cut away to form a passage 22 which communicates with a passage 23 which leads to the bottom of the cylinder 11. The engine fly wheel 24 is revolved in a counter clockwise direction as shown in Fig. 2 and as it does so dips in oil in the lower portion of the fly wheel housing, not shown. This oil is thrown off by centrifugal force and striking the lower end of the magneto contact body 15 is forced up through the passages 22 and 23 into the lower portion of the cylinder 11.

A float 25 of cork or the like lies in this cylinder and this carries a small plate 26 upon a stem 26$^a$. This plate is normally some distance from the glass plate 12 when the float 25 is at the bottom of the cylinder 11. The top of the plate 26 is painted to differentiate it from the side wall 11$^a$ of the cylinder, the paint being preferably white, and the side wall being red.

A tube 27 is connected to the side of the cylinder 11 near the top of the float 25, the latter having an annular groove 25$^a$ therein which lies in front of the end of the tube 27 when the float 25 is raised until the plate 26 is substantially in contact with the glass plate 12. The tube 27 extends forward along the side of the engine as shown in Fig. 1 and delivers to the breather pipe 28 at the further end of the crank case.

From the foregoing it will be understood that with the engine running at a uniform rate of speed as for example, when it is travelling at the rate of 15 miles per hour, the highest to which the float 25 is raised will depend largely upon the depth at which the engine fly wheel dips into the oil in the housing surrounding it. If the plate is raised until it is substantially in contact with the glass cover 12, the operator knows that he has a sufficient quantity of oil in the crank case. If however at this speed it is only raised about half this distance the engine is in need of oil and if it is not raised at all, the need of oil is imperative and the engine should be stopped until some oil can be obtained to prevent damage being done to the engine.

As the float rises the groove 25$^a$ is brought substantially in front of the end of the pipe 27 and oil readily passes through the groove 25$^a$ and out through the pipe and is carried hence to the forward end of the crank case thereby providing an additional means for circulating oil therein.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. An oil gauge for automobile engines comprising a fly-wheel, a housing formed with a magneto contact body receiving portion having a reduced lower end adapted to fit in an opening in the transmission housing and to leave a portion of such opening at one side of the reduced portion of the magneto contact body unobstructed for the passage of oil, a fly wheel casing adjacent the periphery of the fly wheel into which said reduced lower end of the magneto contact body extends and in the path of oil thrown by said fly wheel as it revolves, said housing being equipped with an oil passage extending therethrough with its lower end registering with the opening in the transmission housing, and a float slidable in said first-named housing and operated by the flow of oil therethrough.

2. An oil gauge for automobile engines comprising a fly-wheel, a housing formed with a magneto contact body receiving portion having a reduced lower end adapted to fit in an opening in the transmission housing and to leave a portion of such opening at one side of the reduced portion of the magneto contact body unobstructed for the passage of oil, a fly wheel casing adjacent the periphery of the fly wheel into which said reduced lower end of the magneto contact body extends and in the path of oil thrown by said fly wheel as it revolves, said housing being equipped with an oil passage registering with the opening in the transmission housing, a float slidable in said first-named housing and operated by the flow of oil therethrough and a pipe leading from said housing to another part of said engine to provide a circulation of the oil.

3. An oil gauge for automobile engines comprising a fly-wheel, a housing formed with a magneto contact body receiving portion having a reduced lower end adapted to fit in an opening in the transmission housing and to leave a portion of such opening at one side of the reduced portion of the magneto contact body unobstructed for the passage of oil, a fly wheel casing adjacent the periphery of the fly wheel into which said reduced lower end of the magneto contact body extends and in the path of oil thrown from said fly wheel as it revolves, said housing being equipped with an oil passage registering with the opening in the transmission housing, a float slidable in said first-named housing and operated by the flow of oil thereto, a stem carried by the float, a plate carried by the upper end of said stem, and a window through which the position of said float may be seen.

4. An oil gauge for automobile engines comprising a fly-wheel, a housing formed with a magneto contact body receiving portion having a reduced lower end adapted to fit in an opening in the transmission housing and to leave a portion of such opening at one side of the reduced portion of the magneto contact body unobstructed for the passage of oil, said reduced portion projecting into a fly wheel casing adjacent the periphery of the fly wheel and in the path of oil thrown from said fly wheel as it revolves, said housing being equipped with an oil passage registering with the opening in the transmission housing, a float slidable in said first-named housing and operated by the flow of oil thereto, and a window in the upper portion of said housing through which the position of said float may be seen.

JOHN W. BATE.